United States Patent
Das et al.

(10) Patent No.: US 9,569,196 B2
(45) Date of Patent: Feb. 14, 2017

(54) APP STORE UPDATE NOTIFICATION AND WARNING SYSTEM

(71) Applicant: PayPal, Inc., San Jose, CA (US)

(72) Inventors: Ananya Das, San Jose, CA (US); Jason Ziaja, San Jose, CA (US); Bryant Genepang Luk, San Jose, CA (US); Jennifer T. Brenner, San Jose, CA (US); Yu Tang, San Jose, CA (US); Robert He, San Jose, CA (US); Christopher Diebold O'Toole, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/577,025

(22) Filed: Dec. 19, 2014

(65) Prior Publication Data

US 2016/0179498 A1    Jun. 23, 2016

(51) Int. Cl.
 *G06F 9/44* (2006.01)
 *G06F 9/445* (2006.01)
 *G06F 11/36* (2006.01)

(52) U.S. Cl.
 CPC ............. *G06F 8/65* (2013.01); *G06F 11/3664* (2013.01)

(58) Field of Classification Search
 CPC ................. H04M 3/322; H04M 3/2227; G06F 8/68–8/78
 USPC .................................. 379/9.04; 717/168–178
 See application file for complete search history.

(56) References Cited

U.S. PATENT DOCUMENTS

| | | | |
|---|---|---|---|
| 6,654,786 B1 * | 11/2003 | Fox .......................... | H04L 29/06 709/203 |
| 6,947,922 B1 * | 9/2005 | Glance .............. | G06F 17/30017 705/26.1 |
| 8,099,332 B2 * | 1/2012 | Lemay ...................... | G06F 8/61 705/26.1 |
| 8,438,532 B2 * | 5/2013 | Fox .......................... | G06F 8/36 717/100 |
| 8,515,828 B1 | 8/2013 | Wolf et al. | |

(Continued)

OTHER PUBLICATIONS

Analysis of User Comments: An Approach for Software Requirements Evolution—Laura V. Galvis Carreno and Kristina Winbladh—Department of Electrical and Computer Engineering, University of Delaware, DE USA—2013 IEEE.*

(Continued)

*Primary Examiner* — Francisco Aponte
(74) *Attorney, Agent, or Firm* — Haynes and Boone, LLP (57) ABSTRACT

A system for maintaining and upgrading hardware device functioning provides processes to select and install updates for software (e.g., applications or apps) on the hardware device. A notification system provides information for discretion and control over the selection of software updates to be applied to consumer mobile devices according to the particular characteristics of the device, e.g., the model of device, the specific operating system of the device, and software applications installed on the device. The notification system may be integral with app stores on mobile devices and tablets, and may also be applicable to the Internet of Things. A notification may take the form, for example, of a warning or recommendation associated with an update for an app on the user device and may enable the user to make an informed decision beforehand about whether or not to install a particular update on the user device.

20 Claims, 4 Drawing Sheets

(56) References Cited

U.S. PATENT DOCUMENTS

| | | | | |
|---|---|---|---|---|
| 8,612,582 B2* | 12/2013 | Dare | ............ | G06F 8/60 370/352 |
| 8,615,581 B2* | 12/2013 | Dare | ............ | H04L 41/0253 370/352 |
| 8,650,290 B2* | 2/2014 | Dare | ............ | G06F 3/0481 455/3.01 |
| 8,731,529 B2* | 5/2014 | Lindeman | ............ | H04W 4/001 455/414.1 |
| 8,756,120 B2* | 6/2014 | Ntawanga | ............ | G06Q 30/06 345/441 |
| 8,788,655 B2* | 7/2014 | Dare | ............ | G06F 8/61 370/352 |
| 8,925,092 B1* | 12/2014 | Johansson | ............ | H04L 63/1433 726/25 |
| 9,098,860 B2* | 8/2015 | Bjork | ............ | G06Q 30/02 |
| 9,224,427 B2* | 12/2015 | Black | ............ | G11B 27/28 |
| 2007/0169079 A1* | 7/2007 | Keller | ............ | G06F 8/65 717/168 |
| 2007/0282670 A1* | 12/2007 | Repasi | ............ | G06F 17/30864 705/306 |
| 2008/0133681 A1* | 6/2008 | Jackson | ............ | G06F 11/0709 709/206 |
| 2008/0234919 A1* | 9/2008 | Ritter | ............ | F02D 41/22 701/114 |
| 2011/0307354 A1* | 12/2011 | Erman | ............ | G06F 8/60 705/27.1 |
| 2012/0317266 A1* | 12/2012 | Abbott | ............ | G06Q 30/0278 709/224 |
| 2013/0111592 A1* | 5/2013 | Zhu | ............ | G06F 21/577 726/25 |
| 2013/0325573 A1* | 12/2013 | Park | ............ | G06Q 30/0241 705/14.16 |
| 2013/0326465 A1* | 12/2013 | Jain | ............ | G06F 8/77 717/100 |
| 2013/0332940 A1* | 12/2013 | Hackborn | ............ | G06F 9/461 719/312 |
| 2014/0074650 A1* | 3/2014 | Elias | ............ | G06F 17/30867 705/26.7 |
| 2014/0149435 A1* | 5/2014 | Sisman | ............ | G06F 11/362 707/751 |
| 2014/0156660 A1 | 6/2014 | Arbon et al. | | |
| 2014/0188897 A1 | 7/2014 | Baker et al. | | |
| 2014/0258309 A1* | 9/2014 | Young | ............ | G06F 17/3053 707/748 |
| 2014/0282476 A1 | 9/2014 | Ciudad et al. | | |
| 2014/0289158 A1 | 9/2014 | Falodiya et al. | | |
| 2014/0289314 A1* | 9/2014 | Dare | ............ | G06F 8/61 709/203 |
| 2014/0344182 A1* | 11/2014 | Kapoor | ............ | G09B 7/00 705/347 |
| 2015/0120581 A1* | 4/2015 | Rutherford | ............ | G06Q 30/0645 705/307 |
| 2015/0317063 A1* | 11/2015 | Felt | ............ | G06F 3/04842 715/835 |

OTHER PUBLICATIONS

MyMediaLite: A Free Recommender System Library—Zeno Gantner, Christoph Freudenthaler, Lars Schmidt—Thieme-Machine Learning Lab. University of Hildesheim—Steffen Rendle—Social Network Analysis University of Konstanz; RecSys'11, Oct. 23-27, 2011, Chicago, Illinois, USA.*

Discovering Community Preference Influence Network by Social Network Opinion Posts Mining—Tamanna S. Mumu and Christie I. Ezeife—School of Computer Science, University of Windsor, Windsor, Ontario N9B 3P4, Canada—LNCS 8646, pp. 136-145, 2014-Springer International Publishing Switzerland 2014.*

Which App? A recommender system of applications in markets: Implementation of the service for monitoring users' interaction—Enrique Costa-Montenegro, Ana Belén Barragáns-Martinez and Marta Rey-López- E. Costa-Montenegro et al. / Expert Systems with Applications 39 (2012) 9367-9375.*

Collaborative Filtering Recommender Systems—J. Ben Schafer,Department of Computer Science University of Northern Iowa—Dan Frankowski, Shilad Sen—Department of Computer Science University of Minnesota—Jon Herlocker—School of Electrical Engineering and Computer Science Oregon State University—The Adaptive Web, LNCS 4321, pp. 291-324, 2007.*

Secure Software Installation on Smartphones—David Barrera, P.C. van Oorschot—Carleton University—Nov. 3, 2010.*

* cited by examiner

APP STORE UPDATE NOTIFICATION AND WARNING SYSTEM

BACKGROUND

Field of the Invention

Embodiments of the present disclosure generally relate to technology for maintaining and improving hardware device functioning that is driven by software (e.g., applications or apps) and, more particularly, to providing discretion and control over which software updates are selected to be applied to any particular device.

Related Art

A wide variety of application programs, known as apps or mobile apps, are available for installation on consumer mobile devices, such as smartphones and tablets. Some apps are available for free while others may be purchased through a digital distribution system generally referred to as an app store. App store may also refer to an app, installed on a consumer mobile device, that provides a consumer user with access and interface to an app store system so that, using an app store app, a user can purchase apps using the mobile device and download apps directly to the user's mobile device. Different versions of an app store may be available, for example, depending on the specific operating system (OS) that runs the particular mobile device.

Occasionally—and for some types of apps, routinely—an app will be updated as improvements are made to the app or changes are made to the app to correct malfunctions or other undesired effects, commonly referred to as "bugs". Such mobile app updates may be available, or even disseminated to the user, from the app store via the app store app. Mobile app updates can, however, introduce bugs that can render an application unusable despite being carefully vetted through the app store.

Moreover, mobile app updates that may be developed for the latest operating systems and devices—yet are capable of being installed and running on an older version of the same operating system—may cause various issues for an older operating system or device, such as slowing the system down or "breaking" it (e.g., causing the OS to "lock up" requiring a reboot). Without any kind of automated system that can alert a user before the user has actually updated the app and is encountering the problem, an unsuspecting user may accept or install such an update, having no better option than to go about reading reviews manually, looking at ratings, or just installing the update in the device to try it out, risking changes (that can be, for all practical purposes, irreversible) to the device that can cause serious issues for the operation of the mobile device or otherwise can be, at best, annoying for the user.

In addition to mobile devices such as smart phones and tablets, a wide variety of devices such as smart thermostat systems, washer-dryers that utilize Wi-Fi for remote monitoring, heart monitoring implants, biochip transponders on farm animals, automobiles with built-in sensors, or field operation devices that assist fire-fighters in search and rescue are coming to include uniquely identifiable embedded computing devices that can be interconnected within the existing Internet infrastructure, referred to as the Internet of Things, or the Internet of Everything. Such devices and their software applications will need updating and will be subject to similar problems as described above for user mobile devices.

Thus, there is a need for an improvement to the technology of updating software in the field of maintaining and improving hardware device functioning.

Embodiments of the present disclosure and their advantages may be best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

The present disclosure describes systems and methods that, in one or more embodiments, aid software and system maintenance by providing information for discretion and control over the selection of software updates to be applied to consumer mobile devices according to the particular characteristics of any particular device, e.g., the specific operating system and software applications installed on the device. Thus, embodiments may improve the technology for maintaining and upgrading hardware device functioning by improving the processes that provide and install updates for software (e.g., applications or apps). The notification system may be provided for app stores on mobile devices and tablets, which are platforms that rely on periodic updates to push changes; hence, the notification system may also become applicable to app stores for the Internet of Things.

The provided information for discretion and control over updates may take the form of a notification to a user of a user device about an update that is specific to the user device, its operating system, or an app installed on the user device. Thus, only notifications relevant to the user, device, or apps on the device are given to the user. A notification may take the form, for example, of a warning or recommendation associated with an update for an app on the user device. The notification may enable the user to make an informed decision about whether or not to install a particular update to an app on the user device before taking the risk of installing the update. Often, side effects of installing a particular update on a device may not be removable from the device; so such a notification system can be particularly beneficial and welcomed by a wide variety of users.

In one embodiment, such a notification system can be an integral part of an app store application that is installed on a user device. In another embodiment, the notification system can be implemented as a standalone application on the user device that has information as to which applications are installed on the particular device and are subject to being updated.

In one or more embodiments, the notification system may have information about device specific details such as the model of the device and the operating system used on the device. One or more embodiments may provide different levels of warning based on settings chosen by user. In one example, higher levels of warning may be provided based on members of the user's circle of trust (e.g., Facebook® friends, Google+® circles) giving negative reviews. In one strategy to prevent competitors from "gaming" the system, the user could choose to widen the circle of trust by including prominent reviewers who wrote bad reviews about the update. In another example, a warning may be provided based on ratings of an app suddenly falling after an update.

In one or more embodiments, app store reviews may be analyzed using natural language processing to search for reviews with complaints (e.g., slowdown of an updated app) about various available updates. The reviews may be sorted by update and filtered by various parameters (e.g., device and operating system) to customize the warning for each particular user device.

In one or more embodiments, a notification may provide information about an update that changes features of the app, for example, by adding graphics or inappropriate content. In such a case, the ratings information for the update may include a flag, or marker, for inappropriate content related to the update for the app, and the system may provide additional options, such as preventing automatic application of the update to the app. In one or more embodiments, the notification system may provide information from early adopters of an update that allows a user to wait for an update to be vetted before applying the update to the user's device. In one or more embodiments, an update verification feature allows installing the update on an image of the user device in a sandbox setting (e.g., a testing environment that isolates untested code changes to protect the device from changes that could be damaging—regardless of the intent of the author of those changes—or which could simply be difficult to revert). Using the sandbox environment, the user can test execution of the app after application of the update to the app, without risking irreversible changes to the user device and the way the app executes on the user device prior to installing the update.

Figure 1:
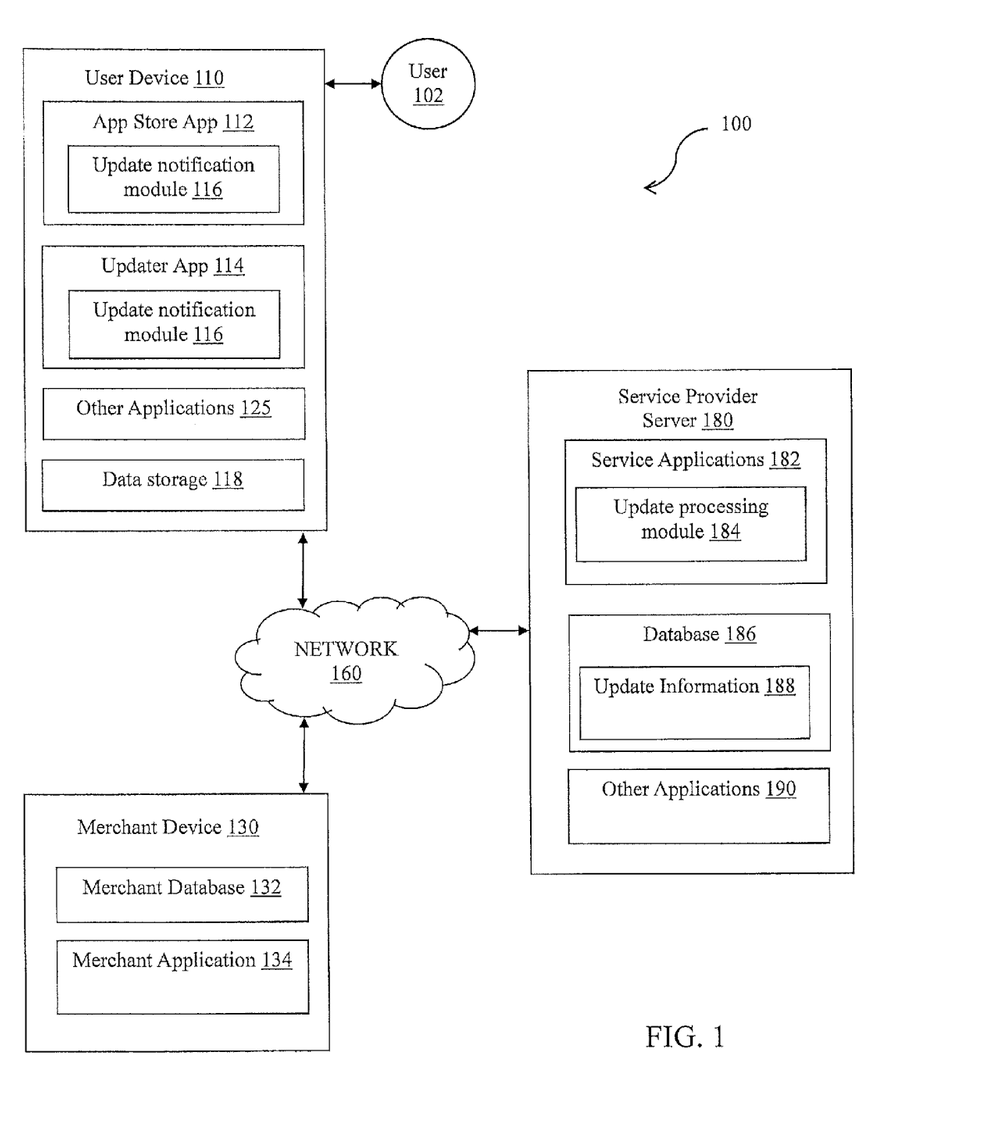
FIG. 1 is a system block diagram illustrating a system for app store update notifications and warnings, in accordance with an embodiment of the disclosure.

FIG. 1 illustrates one or more embodiments of an update system 100 for app store update notifications and warnings, in accordance with an embodiment of the disclosure. User device 110 of system 100 shown in FIG. 1 may include an app store app 112, an updater app 114, and other applications 125. Each of app store app 112 and updater app 114 may include an update notification module 116. App store app 112, updater app 114, update notification module 116, and other applications 125 may correspond to executable processes, procedures, and/or applications with associated hardware, such as device modules. In other embodiments, user device 110 may include additional or different hardware and software as required. App store app 112 may be provided with purchase of user device 110 or may be purchased separately and installed on user device 110. App store app 112 may matched to a particular operating system (e.g., iOS® or Android®) used to operate user device 110.

Notification module 116 may be provided as an integral subsystem of app store app 112. Alternatively, notification module 116 may be provided by way of its own updater app 114 for running the notification module 116 independently of any app store. Either one or both embodiments may be functional on user device 110. User device 110 may include a data storage device 118 (e.g., non-transitory computer readable memory) that stores information, including user preferences and settings for update system 100. Data storage device 118 may also store reviews for one or more apps (e.g., one or more of other applications 125) installed on user device 110. For purposes of simplicity, limiting discussion to one particular app, data storage device 118 may store reviews related to one or more updates to the app. There may be a number of different updates for an app, and for each update there may be different versions of the update. For example, there may be different versions of the update for different versions of the app (e.g., different releases or a release that has previously been updated with an earlier update), for the same app running on different devices or model of device (e.g., Apple® vs. Samsung®, etc.), or for the same app running under different operating systems (e.g., iOS® vs. Android®).

Data storage device 118 may store reviews for the update itself. Data storage device 118 also may store reviews for the app that were given for the app prior to the update being applied (e.g., the update is not installed, so the app runs without any modifications according to the update) to the app, referred to as pre-update reviews for the app. Data storage device 118 may also store reviews for the app that were given for the app after the update being applied (e.g., the update is installed so that the app runs according to the update modifications) to the app, referred to as post-update reviews for the app.

Service provider server 180 of system 100 shown in FIG. 1 may include service applications 182, which when executed on a hardware processor of service provider server 180 provide various functions and services in communication via network 160 with user device 110 and merchant device 130. Examples of some such functions are described below with reference to FIG. 3. Service applications 182 may include an update processing module 184, which can perform functions similar or equivalent to functions performed by update notification module 116. Update processing module 184 may be in communication with and have access to database 186. Database 186 may store update information 188, which may include the same or equivalent information about apps, updates, and reviews that is stored by data storage device 118. Service provider server 180 may also include other applications 190. Service applications 182, update processing module 184, and other applications 190 may correspond to executable processes, procedures, and/or applications with associated hardware, such as device modules. In other embodiments, service provider server 180 may include additional or different hardware and software as required.

Merchant device 130 of system 100 shown in FIG. 1 may include a merchant database 132, which may store the same or equivalent information about apps, updates, and reviews that is stored by data storage device 118, database 186, and update information 188. Merchant device 130 may also include other applications such as merchant application 134. Merchant application 134 may be in communication with and have access to database 132. Merchant application 134 and database 132 may correspond to executable processes, procedures, and/or applications with associated hardware, such as device modules. In other embodiments, merchant device 130 may include additional or different hardware and software as required. Merchant application 134 may provide various functions, for example, that in communication via network 160 allow user 102 to purchase an app store app 112, purchase apps from the app store 112, and provide updates and update notification functionality in accordance with embodiments of update system 100. Various examples of some such functions are described below with reference to FIG. 3.

Any of update notification module 116, update processing module 184, data storage device 118, database 186, update information 188, and merchant database 132 may receive and store information about an app that is installed on the user device 110. Such information may include for example, the name of the app, its version, the device, and model of device it is installed on, the operating system being used, and other information that may be needed regarding the execution environment of the app that is specific to the device for which an update notification is being processed.

As described above there may be a number of different apps and versions of apps, different updates for an app, and for each update there may be different versions of the update. Versions may differ, for example, according to device and operating system used. Limiting discussion to one particular app for simplicity as above, any of the aforementioned devices and modules (update notification module 116, update processing module 184, data storage device 118, database 186, update information 188, and merchant database 132) may store information related to one or more updates to the app. As discussed above the information related to an update may include reviews for the update itself or reviews for the app, both pre-update reviews and post-update reviews, as described above. Reviews may include ratings, which may be negative or positive, or ordered—such as a five star rating system. Reviews may include a marker or flag for inappropriate content added to an app by an update.

Reviews may be processed by either of update notification module 116 or update processing module 184, for example, by comparing pre-update and post-update ratings for an app. If the ratings for the app were to fall (e.g., post-update ratings are lower compared to pre-update ratings) update notification module 116 or update processing module 184 may issue a notification or warning for the particular update for the particular app. Update notification module 116 or update processing module 184 may respond directly to a flag or marker for inappropriate content and issue a notification or warning for the particular update for the particular app immediately without further processing.

In one embodiment, reviews for the update itself may be evaluated similarly, in other words reviews for the update itself may be evaluated as being ratings reviews like the app ratings reviews. Also, reviews for the update itself may be evaluated as being positive or negative. Update notification module 116 or update processing module 184 may determine a summary rating for the update based on the rating or evaluation of the reviews and issue a notification or warning for the particular update for the particular app according to the summary rating.

Figure 3:
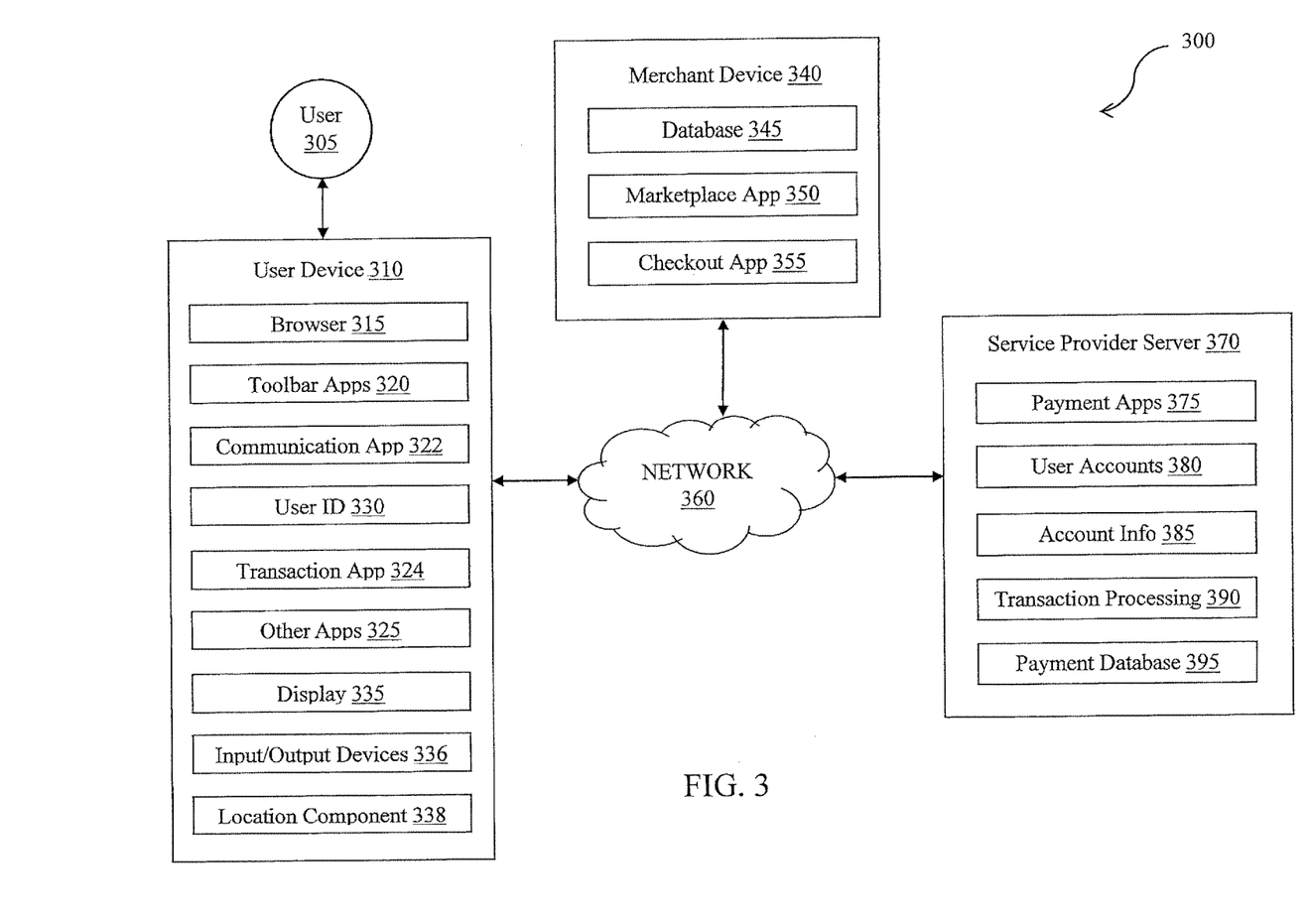
FIG. 3 is a system diagram illustrating a networked system for updates and update notifications and warnings, in accordance with one or more embodiments.

The notification may be displayed on the user device 110 (user device 310 shown in FIG. 3 includes a display 335). Based on preference settings chosen by the user 102, different levels of warnings or notifications may be provided to the user device 110. The settings may stored, for example, on the user device 110, e.g., in data storage device 118. Service provider server 180 may also keep track of user preference settings, for example, using database 186. Different levels of warning may range, for example, from placing a small icon on display 335 where it would be noticed but not interrupt the user to flashing a warning that interrupts whatever the user is looking at. In another embodiment, a warning level (e.g., 1 to 5) may be given with the notification to indicate a level of risk associated with installing the update on the user device. The warning or notification, which may be controlled by the user preference settings, may also include, for example, options to automatically update an app or to prevent updates from being applied.

In one embodiment, natural language processing analysis may be used to search for negative reviews (e.g., post-update reviews with complaints about app performance such as slowing down, losing functionality, or undesired behavior). The reviews may be filtered by one or more factors (for example, filtering may include many factors such as operating system, device, and model of device) so that reviews found by the search and matching to the device may be selected. Based on the selection either of update notification module 116 or update processing module 184, for example, may customize the warning or notification for the user 102, as well as provide notification or other action in accord with user preference settings as described above. In an alternative embodiment, natural language processing analysis may be used to search for positive reviews, and the notification or other action may be correspondingly customized differently.

In one embodiment, database 186 of service provider server 180 or data storage device 118 of user device 110 may include information identifying a circle of trust for the user device 110. Such information may be supplied by user 102 of user device 110 and may be derived, for example, from the user's group of Facebook® friends or Google+® circle. The circle of trust information may be modified by the user 102. In one example, the user could choose to widen the circle of trust by choosing prominent reviewers who wrote bad reviews about the update. A reviewer may gain prominence, for example, by posting a blog with reviews for various apps and their updates. The rationale for this strategy may be to prevent competitors (e.g., publishers of competing apps) from "gaming the system" by distorting the evaluation of reviews by providing either false reviews or overabundance of favorable or unfavorable reviews as needed. The post-update review information received by the update notification or processing module may be adjusted based on at least one negative app store review that is related to the update for the app on the user device and is received from the circle of trust. In another embodiment, determining the summary rating for the update may include adjusting the summary rating based on at least one negative review from the circle of trust of the user.

In one embodiment, database 186 of service provider server 180 or data storage device 118 of user device 110 may include information related to vetting an update by early adopters of an update. Early adopters of an update may provide review related to the update (e.g., either pre- and post-update reviews of the app or reviews of the update) for a pre-determined vetting period, which may start on a release date of the update and extend to an end date for the vetting period. The information related to vetting an update by early adopters of an update may thus include information about the vetting period and reviews by early adopters. The rationale is to allow most users to avoid some risk by letting the early adopters test the update first. After waiting for the expiration of the vetting period for receiving reviews, either of update notification module 116 or update processing module 184, for example, may determine the summary rating for the update based on the reviews by early adopters. The determination may be made as described above, either based on comparing post-update early adopter reviews of the app to pre-update reviews of the app, or based on early adopters' reviews of the update itself. The update notification module 116 may then provide, for display on the user device 110, the warning notification resulting from the vetting process (e.g., based on vetting the update for the app).

In one embodiment, either of update notification module 116 or update processing module 184, for example, may execute the updated app after installing the update on an image of the user device in a sandbox setting (e.g., a testing environment isolated from the rest of user device 110 or service provider server 180). Using the sandbox environment, the user or the service provider can test execution—prior to actually installing the update on user device 11—of the app after application of the update to the app, without risking irreversible changes to the user device or undesired side effects to the way the app executes on the user device.

Figure 2:
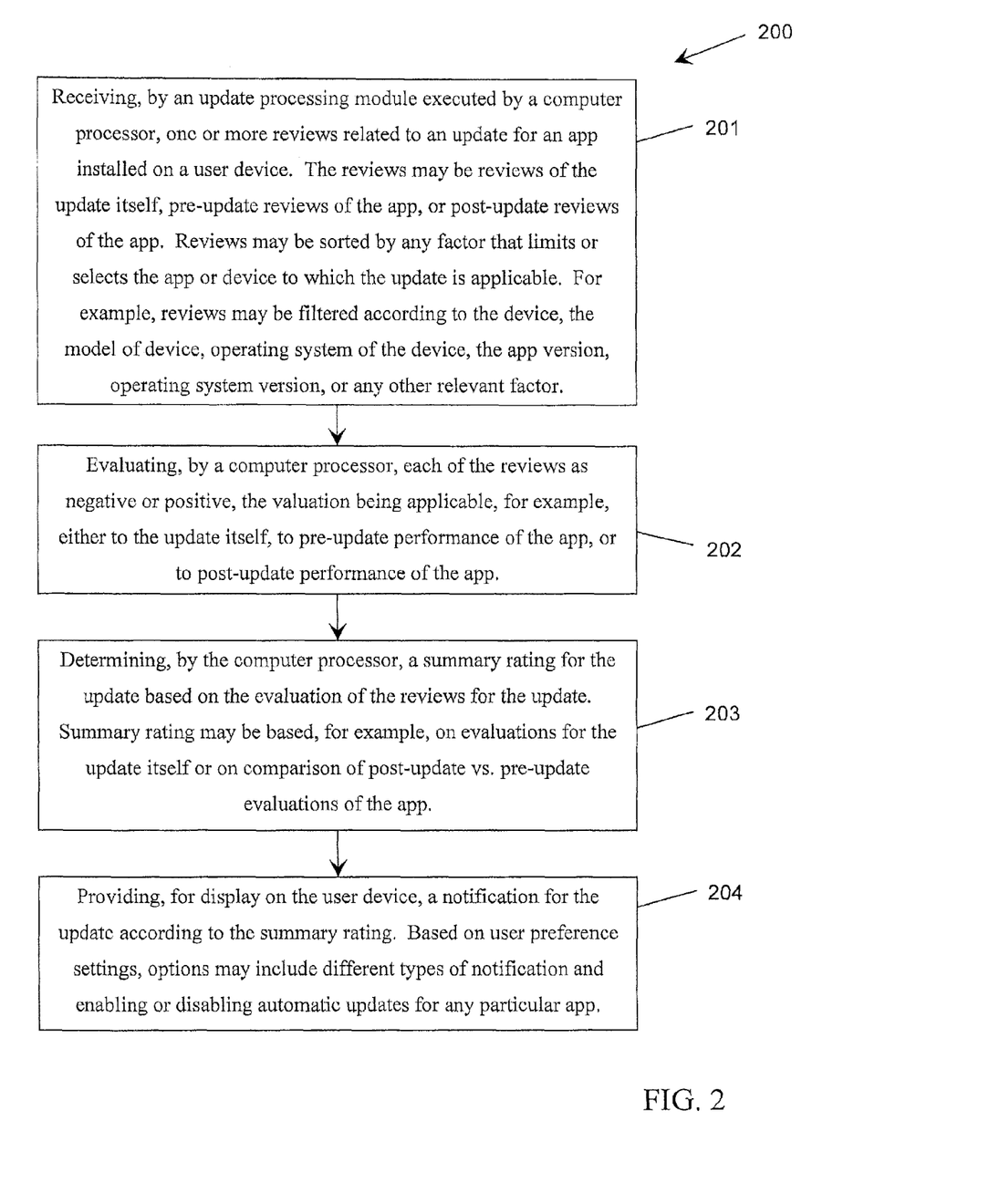
FIG. 2 is a flow diagram illustrating a method for providing app store update notifications and warnings, according to an embodiment.

FIG. 2 is a flow diagram illustrating a method 200 for providing app store update notifications and warnings in accordance with one or more embodiments. At process 201, method 200 may include operations for receiving, by an update processing module (e.g., update notification module 116 or update processing module 184) executed by a computer processor, one or more reviews related to an update for an app installed on a user device (e.g., user device 110). The reviews may be reviews of the update, pre-update reviews of the app, or post-update reviews of the app. Reviews may be sorted by any factor that limits or selects the app or device to which the update is applicable. For example, reviews may be filtered according to the device, the model of device, operating system of the device, the app version, operating system version, or any other relevant factor. In one embodiment, natural language processing analysis may be used to search for appropriate reviews prior to filtering the reviews found by the search. In one embodiment, reviews may be limited to those of early adopters of an update during a vetting period, in order to provide vetting of the update for other users, as described above. In one embodiment, reviews flagging or marking an update that provides inappropriate content or graphics to an app may receive urgent or direct processing.

At process 202, method 200 may include operations for evaluating, by a computer processor (e.g., update notification module 116 or update processing module 184 executing respectively on user device 110 or service provider server 180), each of the reviews from process 201 as negative or positive or otherwise placed into a ratings hierarchy, as described above, with a flag or marker for inappropriate content or graphics overriding the hierarchy. The valuation may be applicable, for example, either to the update itself, to pre-update performance of the app, or to post-update performance of the app.

At process 203, method 200 may include operations for determining, by the computer processor (e.g., update notification module 116 or update processing module 184 executing respectively on user device 110 or service provider server 180), a summary rating for the update based on the evaluation at process 202 of the reviews related to the update (whether update reviews or pre- or post-update app reviews). The summary rating may be based, for example, on evaluations for the update itself or on comparison of post-update vs. pre-update evaluations of the app.

At process 204, method 200 may include operations for providing, for display on the user device (e.g., user device 110), a notification for the update according to the summary rating provided by process 203. Based on user preference settings, options may include different types and levels of notification and may include enabling or disabling automatic updates for any particular app. While notifications have been discussed related to negative reviews and warnings, the notifications can also be issued based on positive reviews or vetting of the upgrade or a new version of the app. A positive notification may be provided, for example, on expiration of a vetting period with no warning or drop in the ratings having occurred. A positive notification may be given, for example, in the case of a comparison of post-update reviews to pre-update reviews yielding an increased rating for the app. Conversely to warning notifications providing risk reduction to a user installing an update, positive notifications may provided increased confidence for a user to install the update for the app.

FIG. 3, is a system block diagram of a networked system 300 suitable for implementing a notification system according to an embodiment. Networked system 300 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

System 300 may include a user device 310, a merchant server 340, and a service provider server 370 in communication over a network 360. Service provider server 370 may be maintained by a payment service provider, such as PayPal, Inc. of San Jose, Calif. A user 305, such as a sender or consumer, may utilize user device 310 to perform a transaction such as an electronic commerce transaction using service provider server 370. A user 305 may utilize user device 310 to initiate a payment transaction, receive a transaction approval request, or reply to the request. Note that transaction, as used herein, refers to any suitable action performed using the user device, including payments, transfer of information, display of information, purchases, sales, online listings, etc. For example, user 305 may utilize user device 310 to initiate a deposit into a savings account. Although only one merchant server is shown, a plurality of merchant servers may be utilized if the user is purchasing products or services from multiple merchants.

User device 310, merchant server 340, and service provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

User device 310 may be implemented using any appropriate hardware and software configured for wired and/or wireless communication over network 360. For example, in one embodiment, user device 310 may be implemented as a personal computer (PC), a smart phone, personal digital assistant (PDA), laptop computer, tablet computer, wristwatch with appropriate computer hardware resources, eyeglasses with appropriate computer hardware (e.g. Google Glass®), other type of wearable computing device, and/or other types of computing devices capable of transmitting and/or receiving data, such as an iPad® from Apple®. Although a user device is shown, the user device may be managed or controlled by any suitable processing device. Although only one user device is shown, a plurality of user devices may function similarly.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet, such as a user account for setting up a shopping list and/or merchant sites for viewing and purchasing products and services. User device 310 may also include one or more toolbar applications 320 which may be used, for example, to provide client-side processing for performing desired tasks in response to operations selected by user 305. In one embodiment, toolbar application 320 may display a user interface in connection with browser application 315.

User device 310 may include a transaction application 324. Transaction application 324 may be used to receive product information, price information, merchant information or other information from service provider server 370 and/or merchant server 340. Transaction application 324 may provide transaction information such as items for sale and/or payment options to display 335 for display to a user.

Transaction application 324 may receive device location information and/or device orientation information from location components 338 (e.g., a global positioning system (GPS) component, one or more accelerometers, a compass, Wi-Fi devices, Near-Field Communication (NFC) devices, etc.). The location information may include GPS coordinates, accelerometer data that indicates an orientation of the device and/or movement of the device or other data that indicates the location, position, and/or orientation of the device. User device 310 may determine a current location of user device 310 based on the collected location data. In another embodiment, user device 310 may send the location data to service provider server 370 and service provider server 370 may determine a current location of user device 310 based on the location data. The transaction information displayed by display 335 in response to instructions from transaction application 324 may include content that is based on the location information and/or may be displayed at a time or at a location on display 335 based on the location information.

User device 310 may include one or more input/output devices 336 (e.g., a keypad, a keyboard, a touch sensitive component, or a camera). For example, input/output devices 336 may include a camera that provides images of background objects (e.g., a continuous video stream of a scene in the field of view of the camera) to transaction application 324 that can be displayed on display 335 with transaction information overlaid on the camera images.

User device 310 may further include other applications 325 as may be desired in particular embodiments to provide desired features to user device 310. For example, other applications 325 may include security applications for implementing client-side security features, programmatic client applications for interfacing with appropriate application programming interfaces (APIs) over network 360, or other types of applications.

Applications 325 may also include email, texting, voice and IM applications that allow user 305 to send and receive emails, calls, and texts through network 360, as well as applications that enable the user to communicate, transfer information, make payments, and otherwise utilize a smart wallet through the service provider as discussed above. User device 310 may include one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the service provider. A communications application 322, with associated interfaces, enables user device 310 to communicate within system 300.

Display 335 may include a touch screen that displays information to user 305 and receives user input from user 305 or display 335 may be a touch insensitive display. Display 335 may be a mobile device display, a projection display that projects images onto a transparent, partially transparent or opaque structure, or may include any other suitable display technology. User device 310 may monitor user input on the touch screen, on any other touch-sensitive device (e.g., a touchpad on a laptop), or using other input components (e.g., a mouse) and may recognize user input for association with transactions, and/or to activate certain functions (e.g., purchase transactions, payment transactions, sales transactions, and listing transactions) based on the displayed transaction information.

Merchant server 340 may be maintained, for example, by a merchant or seller offering various products and/or services. The merchant may have a physical point-of-sale (POS) store front. The merchant may be a participating merchant who has a merchant account with the payment service provider. Merchant server 340 may be used for POS or online purchases and transactions. Generally, merchant server 340 may be maintained by anyone or any entity that receives money, which includes charities as well as banks and retailers. For example, a payment may be a donation to charity or a deposit to a bank account such as a savings account.

Merchant server 340 may include a database 345 identifying available products (including digital goods) and/or services (e.g., collectively referred to as items) which may be made available for viewing and purchase by user 305. Accordingly, merchant server 340 also may include a marketplace application 350 which may be configured to serve information over network 360 to browser 315 of user device 310. In one embodiment, user 305 may interact with marketplace application 350 through browser applications over network 360 in order to view various products, food items, or services identified in database 345.

Merchant server 340 also may include a checkout application 355 which may be configured to facilitate the purchase by user 305 of goods or services online or at a physical POS or store front. Checkout application 355 may be configured to accept payment information from or on behalf of user 305 through payment service provider server 370 over network 360. For example, checkout application 355 may receive and process a payment confirmation from payment service provider server 370, as well as transmit transaction information to the service provider and receive information from the service provider (e.g., a transaction ID). Checkout application 355 may be configured to receive payment via a plurality of payment methods including cash, credit cards, debit cards, checks, money orders, or the like.

Service provider server 370 may be maintained, for example, by an online payment service provider which may provide payment between user 305 and the operator of merchant server 340. In this regard, service provider server 370 includes one or more payment applications 375 which may be configured to interact with user device 310 and/or merchant server 340 over network 360 to facilitate the purchase of goods or services, communicate/display information, and send payments by user 305 of user device 310.

Service provider server 370 also maintains a plurality of user accounts 380, each of which may include account information 385 associated with consumers, merchants, and funding sources, such as banks or credit card companies. For example, account information 385 may include private financial information of users of devices such as account numbers, passwords, device identifiers, user names, phone numbers, credit card information, bank information, or other financial information which may be used to facilitate online transactions by user 305. Payment application 375 may be configured to interact with merchant server 340 on behalf of user 305 during a transaction with checkout application 355 to track and manage purchases made by users and which and when funding sources are used. Payment application 375 may be configured to determine the existence of and to manage accounts for user 305, as well as create new accounts if necessary. Payment application 375 may be configured to execute one or more payment transactions in response to receiving and recognizing a drawn pattern from user 305.

A transaction processing application 390, which may be part of payment application 375 or may be separate from application 375, may be configured to receive information from user device 310 and/or merchant server 340 for processing and storage in a payment database 395. Transaction processing application 390 may include one or more applications for processing information from user 305 for processing an order and for payment using various selected funding instruments, including operations for initial purchase and for payment after purchase as described herein. As such, transaction processing application 390 may store details of an order from individual users, including a funding source used, available credit options, etc. Transaction processing application 390 may be configured to execute one or more transactions such as electronic commerce transactions in response to selection of a transaction option in a transaction display from user 305.

One or more of merchant server 340, service provider server 370, and user device 310 may be used to execute any suitable transaction in response to receiving transaction instructions from a user 305.

Figure 4:
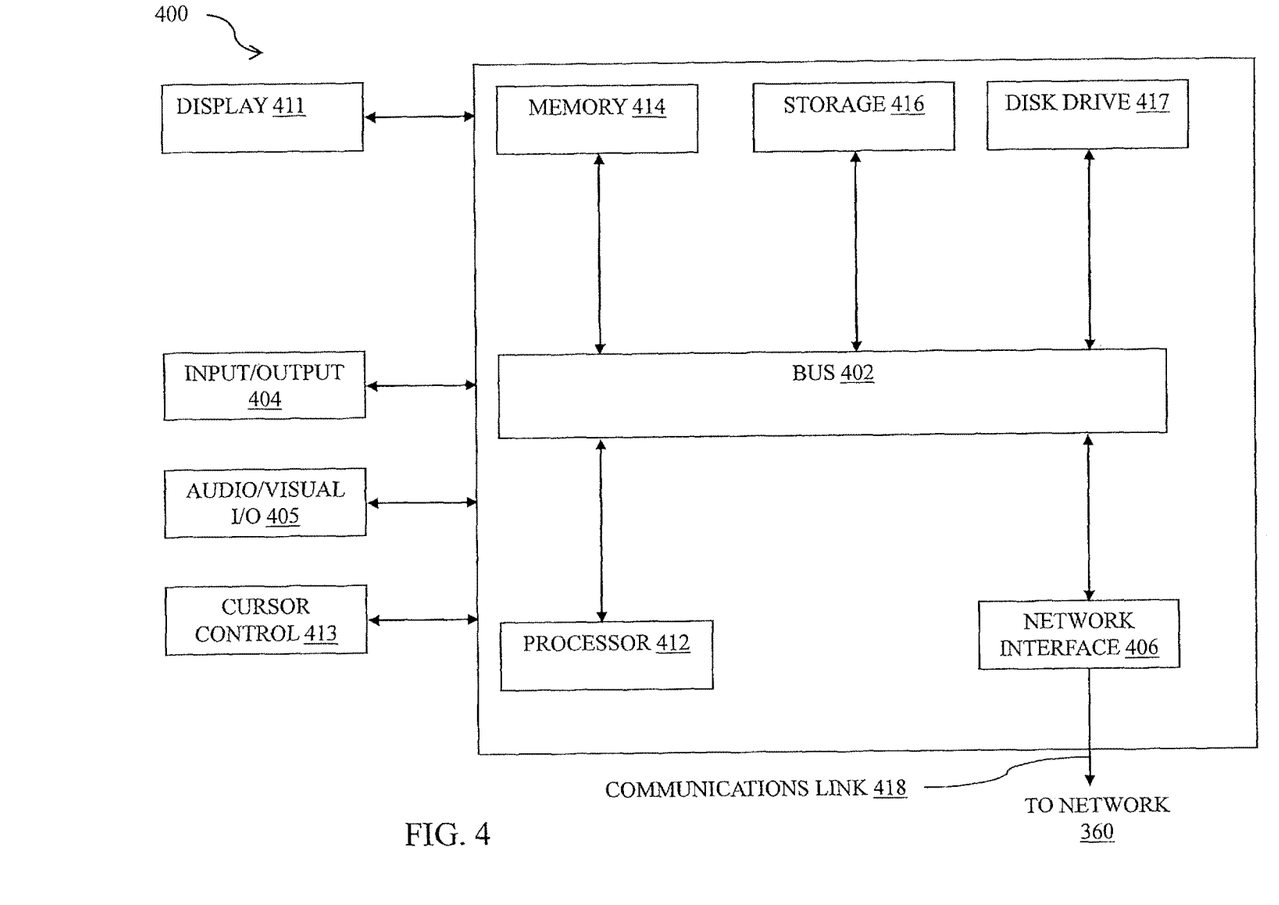
FIG. 4 is a block diagram of an example of a computer system suitable for implementing on one or more devices of the networked system in FIG. 3, according to an embodiment.

FIG. 4 is a block diagram of an example of a computer system 400 suitable for implementing on one or more devices of the networked system in FIG. 3, according to one or more embodiments. In various implementations, the user device may comprise a personal computing device (e.g., smart phone, a computing tablet, a personal computer, laptop, PDA, Bluetooth device, key FOB, badge, etc.) capable of communicating with the network. The merchant and/or service provider may utilize a network computing device (e.g., a network server) capable of communicating with the network. It should be appreciated that each of the devices utilized by users, merchants, and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a service provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in a non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A user device comprising:
    a data storage device storing an update notification module and information about an app that is installed on the user device; and
    at least one hardware processor in communication with the data storage device for executing the update notification module to:
    receive, from at least one server device, post-update review information for the app related to an update for the app;
    compare the post-update review information to pre-update review information for the app, wherein the comparison shows whether a post-update rating for the app is higher or lower than a pre-update rating for the app; and
    provide, for display on the user device, a notification related to the update for the app for a comparison showing the post-update rating changing from the pre-update rating, wherein the notification comprises a warning provided for a comparison showing the post-update rating is lower than the pre-update rating.

2. The user device of claim 1, wherein:
    the data storage device includes information identifying an operating system of the user device; and
    the update notification module is further configured to provide the warning on the identified operating system.

3. The user device of claim 1, wherein:
    the data storage device includes information identifying a model of the user device; and
    the update notification module is further configured to provide the warning on the identified model of user device.

4. The user device of claim 1, wherein:
    the data storage device includes information identifying a model of the user device; and
    the post-update review information received by the update notification module is based on natural language processing analysis of app store reviews of the update for the app on the identified model of the user device.

5. The user device of claim 1, wherein:
    the data storage device includes information identifying a circle of trust for the user device; and
    the post-update review information received by the update notification module is adjusted based on at least one negative app store review that is related to the update for the app on the user device and is received from the circle of trust.

6. The user device of claim 1, wherein:
    the post-update ratings information includes a flag for inappropriate content related to the update for the app; and
    the update notification module provides, for display on the user device, the warning notification related to the update for the app for a post-update rating having the flag, regardless of the comparison.

7. The user device of claim 1, wherein:
    the data storage device includes information for user settings of the update notification module; and
    the update notification module prevents automatic application of the update to the app, according to a user setting of the information for user settings, for a post-update rating having a flag for inappropriate content related to the update for the app.

8. The user device of claim 1, wherein:
    the post-update ratings information includes vetting information related to the update for the app; and
    the update notification module provides, for display on the user device, the warning notification based on vetting the update for the app.

9. The user device of claim 1, wherein:
    the update notification module is further configured to determine a warning level and generate the notification related to the update according to the warning level.

10. The user device of claim 9, wherein the warning level is associated with a level of risk associated with installing the update on the user device.

11. A method comprising:
    receiving, from at least one server device, post-update review information for an app related to an update for the app;
    comparing the post-update review information to pre-update review information for the app, wherein the comparison shows whether a post-update rating for the app is higher or lower than a pre-update rating for the app; and
    providing, for display on a user device, a notification related to the update for the app for a comparison showing the post-update rating changing from the pre-update rating, wherein the notification comprises a warning provided for a comparison showing the post-update rating is lower than the pre-update rating.

12. The method of claim 11, further comprising:
    identifying an operating system of a user device, wherein the warning is configured to be provided on the identified operating system.

13. The method of claim 11, further comprising:
    identifying a model of a user device, wherein the post-update review information is based on natural language processing analysis of app store reviews of the update for the app on the identified model of the user device.

14. The method of claim 11, further comprising:
    identifying a circle of trust for a user device, wherein the post-update review information is received by an update notification module and is adjusted based on at least one negative app store review that is related to the update for the app on the user device and is received from the circle of trust.

15. The method of claim 11, wherein the post-update ratings information includes a flag for inappropriate content related to the update for the app and the method further comprises one or more of:

displaying the warning notification related to the update for the app for a post-update rating having the flag, regardless of the comparison; and/or     preventing automatic application of the update to the app, according to a user setting of the information for user settings, for a post-update rating having a flag for inappropriate content related to the update for the app.

16. A non-transitory machine-readable medium having stored thereon machine-readable instructions executable to cause a machine to perform operations comprising:

receiving, from at least one server device, post-update review information for the app related to an update for the app;

comparing the post-update review information to pre-update review information for the app, wherein the comparison shows whether a post-update rating for the app is higher or lower than a pre-update rating for the app; and     providing, for display on the user device, a notification related to the update for the app for a comparison showing the post-update rating changing from the pre-update rating, wherein the notification comprises a warning provided for a comparison showing the post-update rating is lower than the pre-update rating.

17. The non-transitory machine-readable medium of claim 16, wherein the operations further comprise:

identifying a circle of trust for a user device, wherein the post-update review information is received by an update notification module and is adjusted based on at least one negative app store review that is related to the update for the app on the user device and is received from the circle of trust.

18. The non-transitory machine-readable medium of claim 16, wherein the post-update ratings information includes a flag for inappropriate content related to the update for the app and the operations further comprise one or more of:

displaying the warning notification related to the update for the app for a post-update rating having the flag, regardless of the comparison; and/or     preventing automatic application of the update to the app, according to a user setting of the information for user settings, for a post-update rating having a flag for inappropriate content related to the update for the app.

19. The non-transitory machine-readable medium of claim 16, wherein the post-update ratings information includes vetting information related to the update for the app and the operations further comprise:

displaying the warning notification based on vetting the update for the app.

20. The non-transitory machine-readable medium of claim 16, wherein the operations further comprise:

determining a warning level and generating the notification related to the update according to the warning level, wherein the warning level is associated with a level of risk associated with installing the update on the user device.

\* \* \* \* \*

UNITED STATES PATENT AND TRADEMARK OFFICE
CERTIFICATE OF CORRECTION

PATENT NO. : 9,569,196 B2  
APPLICATION NO. : 14/577025  
DATED : February 14, 2017  
INVENTOR(S) : Ananya Das et al.

Page 1 of 1

It is certified that error appears in the above-identified patent and that said Letters Patent is hereby corrected as shown below:

In the Specification

In Column 7, Line 3, change "user device 11" to --user device 110--.

Signed and Sealed this
Twenty-fifth Day of April, 2017

Michelle K. Lee
*Director of the United States Patent and Trademark Office*